June 14, 1949.   G. R. HOUGHTALING   2,472,975
MACHINE FOR MAKING CIRCULAR FORM TOOLS
Filed Aug. 23, 1946   2 Sheets-Sheet 1

INVENTOR.
GUY R. HOUGHTALING
BY

June 14, 1949.  G. R. HOUGHTALING  2,472,975
MACHINE FOR MAKING CIRCULAR FORM TOOLS
Filed Aug. 23, 1946  2 Sheets-Sheet 2
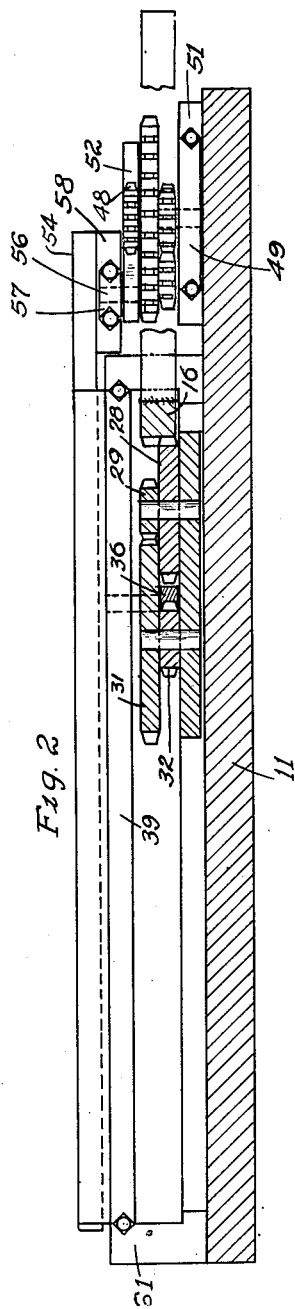
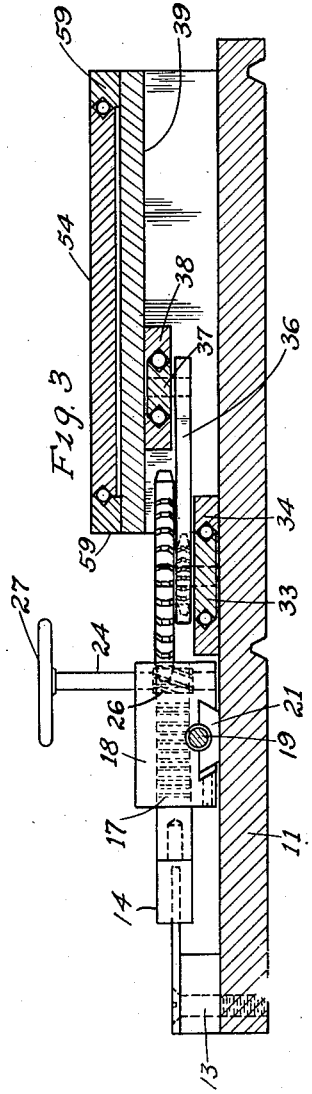
INVENTOR.
GUY R. HOUGHTALING
BY Patented June 14, 1949

2,472,975

UNITED STATES PATENT OFFICE 2,472,975

MACHINE FOR MAKING CIRCULAR FORM TOOLS

Guy R. Houghtaling, Rochester, N. Y.

Application August 23, 1946, Serial No. 692,550

1 Claim. (Cl. 51—50)

My invention relates to machine tools and, more particularly, to a machine for producing a variety of circular form tools used, for example, in automatic screw machines and turret lathes.

An object of my invention is to provide a machine for cutting and/or grinding circular form tools rapidly and which may be handled by a semi-skilled operator who manually controls the movement of a stylus over an enlarged template to form the tool to the exact dimensions and contour required.

Another object of my invention is to provide a machine for making circular form tools which permits the use of an enlarged template which may be made up in sections of the common contours usually found in circular form tools, the sections being capable of use in any series of multiples and combinations, and when assembled on the base, lie in exact relation to the tool to be cut thereby to reproduce a reduced profile on the circular form tool.

A further object of my invention is to provide a machine for cutting circular form tools wherein the center line or axis of the cutting tool lies at all times in right angular relation to the axis of the circular form tool or when an abrasive grinding wheel is employed, the grinding wheel axis lies parallel at all times to the axis of the circular form tool.

Still another object of my invention is to provide a machine for cutting circular form tools in which two hand controls are employed, one governing in and out movement of the cutting tool or abrasive wheel and the other governing right and left movement thereof, the two controls moving the stylus over the template in either direction in exact but enlarged relation and direction to the surfaces on the form tool to be cut.

My invention further contemplates the provision of a machine for cutting circular form tools in which two movable tables are provided which together govern the movements of a cutting tool or abrasive wheel in accordance with the contour of a template, the tables being movable at right angles to each other and being controlled in such manner that a semi-skilled operator may operate two hand wheels which easily and accurately control the movements of the tables so as to accurately follow the template and reproduce the contour of circular form tool desired.

Other objects and advantages of my invention will be set forth more particularly in the claim and will be apparent from the following description, when taken in connection with the accompanying drawings, in which:

Fig. 2 is a sectional view taken substantially on the line 2—2 of Fig. 1 in the direction indicated by the arrows; and Fig. 3 is a view taken substantially on the line 3—3 of Fig. 1 in the direction indicated by the arrows.

Figure 1:
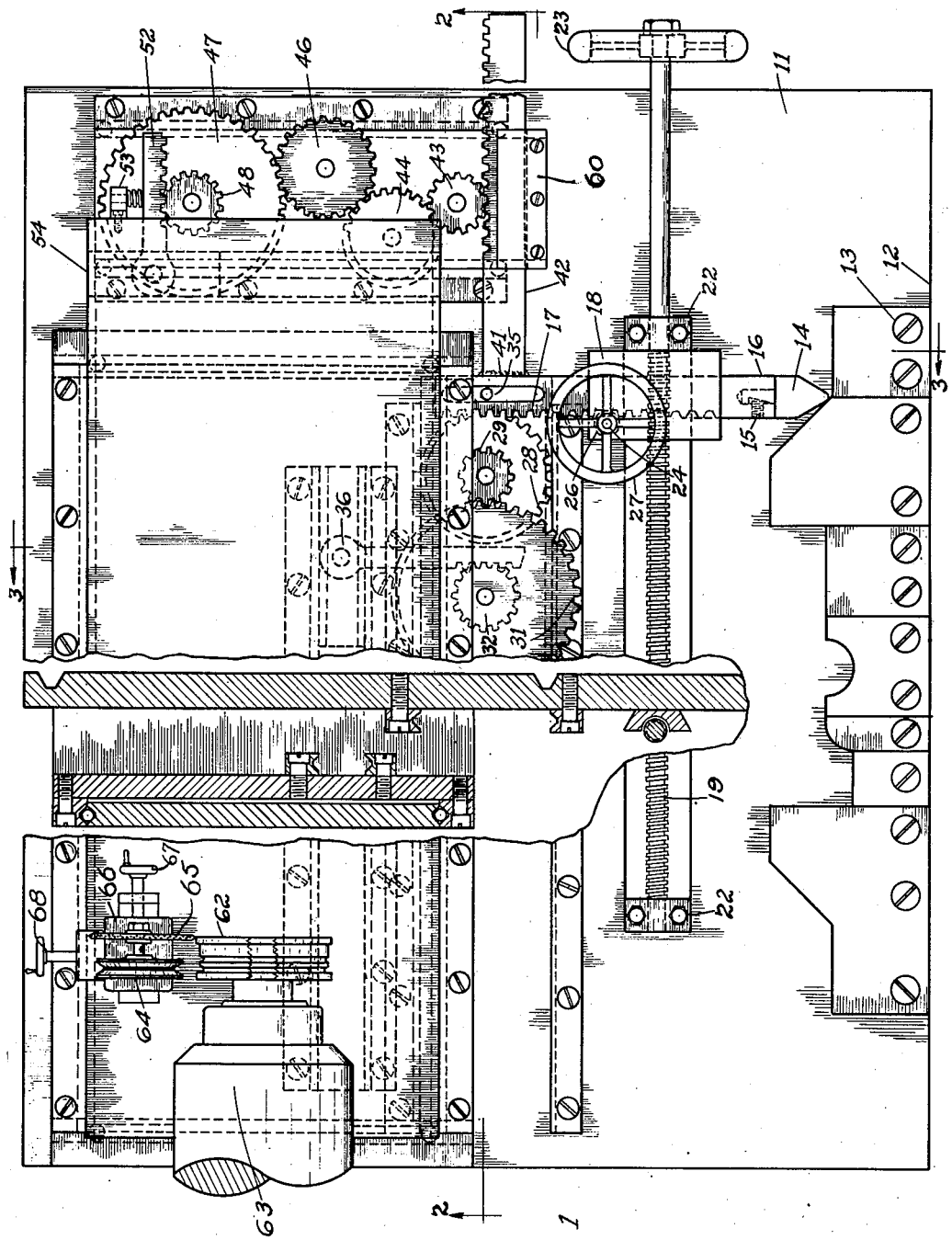
Fig. 1 is a top plan view of the machine of my invention with parts broken away to show a transverse section.

In the drawings, I have shown a fixed table 11 along one straight edge or straight line 12 of which a series of threaded openings are provided. The threaded openings are adapted to receive screws 13 by which any one of a plurality of sections of the common contours usually found in circular form tools may be mounted. As shown by way of example in the drawings, seven common sections or contours have been combined to form a built-up template having the contours desired in the finished form tool.

A stylus finger 14 is adapted to be moved over the contour of the template by means presently described. The stylus finger is carried by a rack 16 in any suitable manner with respect to which it is held by a set screw 15. As is well known in the art to which this invention applies, the stylus finger may be removed and replaced by a finger of different shape when required by reason of the necessity of following the exact contour of the template. The rack 16 has rack teeth 17 and extends through an opening in a block 18.

The block 18 has a threaded bore adapted to receive an elongated worm screw 19 (see Fig. 3). A guide 21 is mounted on the fixed support 11 upon which the block 18 rides as the screw is rotated. The elongated screw is supported in suitable bearings 22 and has fixed to its outer end a hand wheel 23 by which the operator may rotate the screw to shift the block 18 longitudinally of the machine.

The block 18 further has a vertically extending bore in which a shaft 24 is mounted upon the end of which a spiral gear 26 is carried which meshes with the rack teeth 17. A hand wheel 27 serves to rotate the shaft and spiral gear to shift the rack with respect to the block and transversely of the machine.

As shown in Fig. 1, the rack 16 drives a gear train comprising gears 28, 29, 31 and 32. These gears are supported on stub shafts carried by a slide 33 having suitable bearings by which it is slidable in fixed guides 34. In this manner, as will presently appear, when the upper table is moved longitudinally of the machine, the gears 28, 29, 31 and 32 move therewith. The slide 33 is connected to the rack 16 by a pin and slot connection 35.

The gear 32 meshes with a rack 36 one end of which is supported by a guide and the other end of which is connected to a slide 37 by a pin (Fig. 3). The slide has suitable bearings and is movable in a guide 38. A table 39 supports the rack so that as the gears move longitudinally of the machine the rack 36 moves therewith along the guide 38. When the rack 16 is shifted transversely of the machine by rotating the hand wheel 27, the guide 38 is shifted transversely of the machine to shift the lower table 39 transversely.

Fixed with respect to the rack 16, as shown at 41, is a rack 42 which drives a gear train comprising gears 43, 44, 46, 47 and 48. As shown most clearly in Fig. 2, the gears are supported on stub shafts by a slide 49 having suitable bearings and movable transversely of the machine in guides 51. The gear 48 meshes with a rack 52, one end of which is supported by means indicated at 53 and the other end of which is connected to an upper movable table 54. As shown most clearly in Fig. 2, the rack 52 is connected by means of a pin 56 to a slide 57 which has suitable bearings and is movable in guides 58. Connected to the slide 49 is a guide 60 (Fig. 1) in which the rack 42 may slide and by which transverse movements of the rack are transmitted to the slide 49.

It will now be apparent that upon movement of the rack 42 longitudinally of the machine, under the control of the hand wheel 23, the gear train is rotated to shift the rack 52 longitudinally of the machine. This causes the slide 57 to bear against the guide 58 to shift the upper table longitudinally of the machine. The upper table 54 is suitably mounted in ways 59 (Fig. 3) carried by the lower table 39. Similarly the lower table 39 is guided in ways 61 (Fig. 2) which are carried by the fixed table 11 of the machine.

The circular form tool 62 to be cut is carried by a rotatable spindle 63 which may be the spindle of a lathe. In the drawings, I have shown supported on the upper table in any suitable manner an abrasive wheel 65 driven in any suitable manner as by a pulley 64 driven from an external source or which may be directly connected to an electric motor. While I have shown an abrasive wheel, it will be understood that a conventional cutting tool may be substituted for the abrasive wheel.

In the drawings, I have shown the abrasive wheel mounted upon an adjustable support 66 and have indicated hand controls 67 and 68 by which the position of the abrasive wheel may be adjusted. It will be understood that the upper table 54 and the support are provided with suitable reference marks and calibrations to enable the abrasive wheel to be adjusted properly with reference to the work and the template. When a conventional cutting tool is substituted for the abrasive wheel, it is possible to turn the form tool while soft to approximate profile and size. The form tool may then be hardened in any conventional manner, remounted in the spindle and finish ground to exact size and profile. The cutting tool bit can be altered by grinding a standard shaped tool bit to any required angle, radius or form. The exact form or profile of the abrasive grinding wheel required can be obtained by the use of diamond points held in a conventional rotating or sliding grinding wheel dresser.

It will now be appreciated that the operator controls the hand wheels 23 and 27, one with each hand, and causes the stylus finger 14 to follow the contour of the template. When the contour of the template requires a transverse movement of the abrasive wheel 65, he rotates the hand wheel 27, thereby actuating the rack 16, gear train 28, 29, 31 and 32 and rack 36 to shift the lower table transversely thereby carrying the upper table with it and shifting the abrasive wheel transversely with respect to the axis of the circular form tool 62. Similarly when the contour of the template requires a longitudinal movement of the abrasive wheel the operator rotates the hand wheel 23 to shift the block 18 longitudinally carrying with it rack 42 and driving gear train 43, 44, 46, 47 and 48 to thereby actuate rack 52 and shift the upper table 54 longitudinally of the machine to carry the abrasive wheel 65 longitudinally with respect to the axis of the circular form tool.

In the drawings I have shown a reduction through the gear train of ten to one, thereby enabling the use of a template 10 times the size of the circular form tool to be cut. However, this ratio may be varied if desired, but this ratio enables convenient measurements in tenths of an inch.

It will be particularly noted that the axis of the abrasive wheel is at all times maintained parallel to the axis of the circular form tool which results in more accurate contours and greater convenience in dressing the abrasive wheel to the shape desired.

While I have shown and described the preferred forms of my invention, it will be apparent that various changes and modifications may be made therein, particularly in the form and relation of parts without departing from the subject of my invention as set forth in the appended claim.

I claim:

A machine of the character described comprising, in combination, a rotatable spindle in which the work is mounted, a pair of superimposed movable tables, one of which is carried by and movable on the other, a cutting element mounted on the upper table, an enlarged template mounted on said machine with the contours thereof in exact relation to the contours to be cut in the work, a stylus, and means including a bodily movable gear train between the stylus and each of said tables for moving said tables in reduced relation to the dimensions of the stylus and at right angles to each other to move said cutting element over the work in accordance with, but in reduced relation, to the contour of said stylus.

GUY R. HOUGHTALING.

REFERENCES CITED

The following references are of record in the file of this patent:

UNITED STATES PATENTS

| Number | Name | Date |
| --- | --- | --- |
| 1,234,225 | Sickles | July 24, 1917 |
| 2,394,671 | Duncan | Feb. 12, 1946 |